United States Patent
Matsushita et al.

(10) Patent No.: US 8,355,583 B2
(45) Date of Patent: Jan. 15, 2013

(54) IMAGE PROCESSING APPARATUS AND APPARATUS FOR SEARCHING OPERATOR

(75) Inventors: Masahiro Matsushita, Yokohama (JP); Hirotaka Shiiyama, Yokohama (JP); Hiroshi Tojo, Fuchu (JP); Koichi Magai, Tokyo (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 12/242,344

(22) Filed: Sep. 30, 2008

(65) Prior Publication Data

US 2009/0087101 A1 Apr. 2, 2009

(30) Foreign Application Priority Data

Oct. 2, 2007 (JP) ................. 2007-258888

(51) Int. Cl.
- G06K 9/46 (2006.01)
- G06K 9/66 (2006.01)
- G06K 15/00 (2006.01)
- H04N 1/00 (2006.01)
- H04N 1/32 (2006.01)

(52) U.S. Cl. ....... 382/218; 382/190; 358/1.14; 358/403; 358/468

(58) Field of Classification Search .............. None
See application file for complete search history.

(56) References Cited

U.S. PATENT DOCUMENTS

| | | | |
|---|---|---|---|
| 6,704,119 B1 * | 3/2004 | Suzuki et al. | 358/1.16 |
| 7,856,474 B2 * | 12/2010 | Ratcliff | 709/205 |
| 2006/0041719 A1 * | 2/2006 | Chui et al. | 711/117 |
| 2006/0174134 A1 * | 8/2006 | Taylor | 713/186 |
| 2007/0019864 A1 * | 1/2007 | Koyama et al. | 382/218 |
| 2007/0025722 A1 * | 2/2007 | Matsugu et al. | 396/263 |

FOREIGN PATENT DOCUMENTS

| | | |
|---|---|---|
| JP | 2005-051402 A | 2/2005 |
| JP | 2005-84403 | 3/2005 |
| JP | 2007-124431 A | 5/2007 |

\* cited by examiner

*Primary Examiner* — Andrew W Johns
*Assistant Examiner* — David F Dunphy
(74) *Attorney, Agent, or Firm* — Canon USA Inc IP Division

(57) ABSTRACT

An image processing apparatus includes an extraction unit configured to extract a feature amount from information recorded on a recording medium, an acquisition unit configured to acquire an identification image identifying an operator of the recording apparatus, a storage unit configured to store the feature amount and the identification image, wherein the identification image is associated with the feature amount, a search unit configured to compare a feature amount extracted from a predetermined medium by the extraction unit with the feature amount stored in the storage unit, wherein, based on a result of the comparison, the identification image associated with the stored feature amount is associated with the predetermined medium, and an output unit configured to output the identification image associated with the predetermined medium.

8 Claims, 14 Drawing Sheets

FIG.9

| IMAGE ID | IMAGE OF OPERATOR |
|---|---|
| 00000001 | 00000001.jpg |
| 00000002 | 00000002.jpg |
| 00000003 | 00000003.jpg |
| 00000004 | 00000004.jpg |

FIG.10

| IMAGE ID | REGION ID | ATTRIBUTE OF REGION |
|---|---|---|
| 00000001 | 0001 | PICTURE |
| 00000001 | 0002 | PICTURE |
| 00000001 | 0003 | TEXT |
| 00000002 | 0001 | PICTURE |
| 00000002 | 0002 | TEXT |
| 00000003 | 0001 | PICTURE |
| 00000003 | 0002 | TEXT |
| 00000004 | 0001 | PICTURE |
| 00000004 | 0002 | TEXT |

FIG.11

| IMAGE ID | REGION ID | FEATURE AMOUNT |
|---|---|---|
| 00000001 | 0001 | . . . . . . . |
| 00000001 | 0002 | . . . . . . . |
| 00000002 | 0001 | . . . . . . . |
| 00000003 | 0001 | . . . . . . . |
| 00000004 | 0001 | . . . . . . . |

FIG.15

|   | 1 | 2 | 3 | 4 | 5 | 6 | 7 | 8 | ..... |
|---|---|---|---|---|---|---|---|---|-------|
| 1 | 0 | 1 | 1 | 5 | 1 | 5 | 7 | 7 | ..... |
| 2 |   | 0 | 2 | 1 | 1 | 7 | 2 | 5 | ..... |
| 3 |   |   | 0 | 7 | 1 | 1 | 5 | 2 | ..... |
| 4 |   |   |   | 0 | 1 | 9 | 1 | 7 | ..... |
| ⋮ |   |   |   |   |   |   |   |   |       |

FIG.16

| IMAGE ID | DATE |
|----------|------|
| 00000001 | 20061212 10:23:15 |
| 00000002 | 20061212 12:15:13 |
| 00000003 | 20061212 23:59:03 |
| 00000004 | 20061213 00:02:35 |

IMAGE PROCESSING APPARATUS AND APPARATUS FOR SEARCHING OPERATOR

BACKGROUND OF THE INVENTION

1. Field of the Invention

The present invention relates to an image processing apparatus, a method, and a program for monitoring apparatuses that output a medium such as a printer.

2. Description of the Related Art

Recently, stores offer services for copying and printing photographs by utilizing a copying machine. However, in these services, a user often leaves a document and an output medium behind.

To address such a problem, in a technique discussed in Japanese Patent Application Laid-Open No. 2005-84403, when a user uses a printer, the printer urges the user to discharge a document at predetermined timing, thereby preventing the document from being left.

However, there is a case in which a user does not notice an indication or a caution sound which urges the user to discharge a document, or leaves a discharged document on a stand. Further, there is a case in which a user takes out an original document but leaves an outputted printed matter behind.

When a printed matter is left behind, it is difficult for a manager of a printing machine such as a store clerk to confirm that a person who returns to the store to get the document or the printed matter back is a possessor of the document who left it behind.

SUMMARY OF THE INVENTION

The present invention is directed to an image processing apparatus, a method, and a program for monitoring apparatuses that output a medium such as a printer.

According to an aspect of the present invention, an image processing apparatus includes an extraction unit configured to extract a feature amount from information recorded on a recording medium, an acquisition unit configured to acquire an identification image identifying an operator of the image processing apparatus, a storage unit configured to store the feature amount and the identification image, wherein the identification image is associated with the feature amount, a search unit configured to compare a feature amount extracted from a predetermined medium by the extraction unit with the feature amount stored in the storage unit, wherein based on a result of the comparison, the identification image associated with the feature amount stored in the storage unit is associated with the predetermined medium, and an output unit configured to output the identification image associated with the predetermined medium.

According to exemplary embodiments of the present invention, a user who outputs a printed matter can be easily identified since a date and time of print output can be searched from the printed matter.

Further, according to the exemplary embodiments of the present invention, a user who outputs a printed matter can be easily identified by storing and associating an image that can identify an operator with a feature amount of an image and printing information read from a document, and the date and time of the print output.

Further features and aspects of the present invention will become apparent from the following detailed description of the exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a table illustrating an example of information associating an image identification (ID) as index information with an image of an operator as information for identification.

FIG. 10 is a table illustrating an example of index information including an image ID, a region ID, and a region attribute.

FIG. 11 is a table illustrating an example of index information including an image ID, a region ID, and a feature amount.

FIG. 15 is a diagram illustrating an example of a configuration of a color bin penalty matrix.

FIG. 16 is a table illustrating an example of index information including an image ID, and a date and time.

DETAILED DESCRIPTION OF THE EMBODIMENTS

Various exemplary embodiments, features, and aspects of the invention will be described in detail below with reference to the drawings.

First Exemplary Embodiment

According to the present exemplary embodiment, as an example, a camera for capturing an image of an operator who operates a copying machine is equipped as a part of the copying machine.

Figure 1:
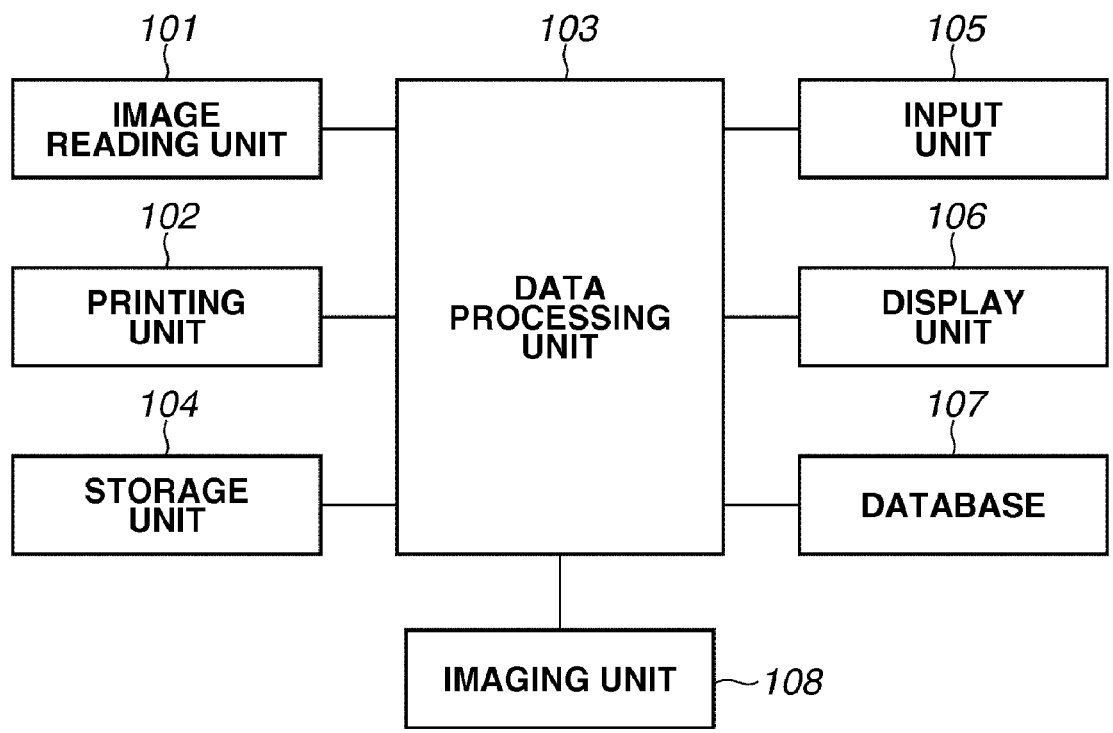
FIG. 1 is a block diagram illustrating an example of a configuration of an image processing apparatus according to exemplary embodiments of the present invention.

FIG. 1 is a block diagram illustrating a configuration of an image processing apparatus according to the present exemplary embodiment.

In FIG. 1, an image reading unit 101 includes a document stand or an automatic document feeder (ADF), and a medium reader. The image reading unit 101 reads an image recorded or stored in a document. When an image is read using the document stand or the ADF, a document image on the document is read by an optical system (not shown) to obtain a raster image. When an image is read by the medium reader, information is magnetically or optically read from a recording medium such as a magnetic memory, a magnetic disk, an optical disk, and a magneto-optical disk to obtain the image. Hereinafter, the image reading unit 101 will be described as the document stand for clarity.

In the present exemplary embodiment, a paper document is described as an example of a medium that carries an image read on the document stand of the image reading unit 101. However, a recording medium other than paper (for example, an overhead projector (OHP) sheet, permeable document such as a film, and a fabric) may be a medium that carries the read image.

Further, an image forming apparatus has a copying function for recording an image corresponding to a record signal on the recording medium in a printing unit 102.

A central processing unit (CPU) (not shown) included in a data processing unit 103 executes a program stored in a random access memory (RAM) included in a storage unit 104. The CPU processes printing information read from the document to generate the record signal. The storage unit 104 includes at least one storage medium such as the RAM which stores the program and an image signal, a read only memory (ROM) which is a nonvolatile memory for storing a program and a parameter that do not need to be changed, or a hard disk drive (HDD).

When one document image is copied, the data processing unit 103 processes the printing information to generate the record signal, and transmits the generated record signal to the printing unit 102.

When a plurality of document images is copied, the data processing unit 103 stores the image signal generated by the data processing unit 103 in the storage unit 104 and sequentially outputs the stored image signals to the printing unit 102 to print it on the recording medium.

An operator inputs an instruction from an input unit 105. The data processing unit 103 processes the instruction and controls the image forming apparatus. Further, a state of the image forming apparatus and image data in the processing are displayed on a display unit 106.

A database 107 stores a feature amount of the image data read by the image reading unit 101 in association with an identification image captured by an imaging unit 108, which will be described below. Here, the feature amount refers to information related to the image data. The feature amount may be the image data itself if minute processing is to be executed. However, generally, quantified information about reduced image, a color configuration or layout of the reduced image can be registered as the feature amount.

The imaging unit 108 is provided to capture the identification image which identifies the operator. The imaging unit 108 includes a video camera, a still camera and the like mounted on the image forming apparatus. The imaging unit 108 is installed at a place where a face of the operator who uses the apparatus can clearly be captured.

The image processing apparatus in the present exemplary embodiment executes two types of processing. One is registration processing of the image data when an image is read and printed in a printing operation. Another is search processing for searching a possessor (or operator) of a document or a printed matter left behind.

Figure 2:
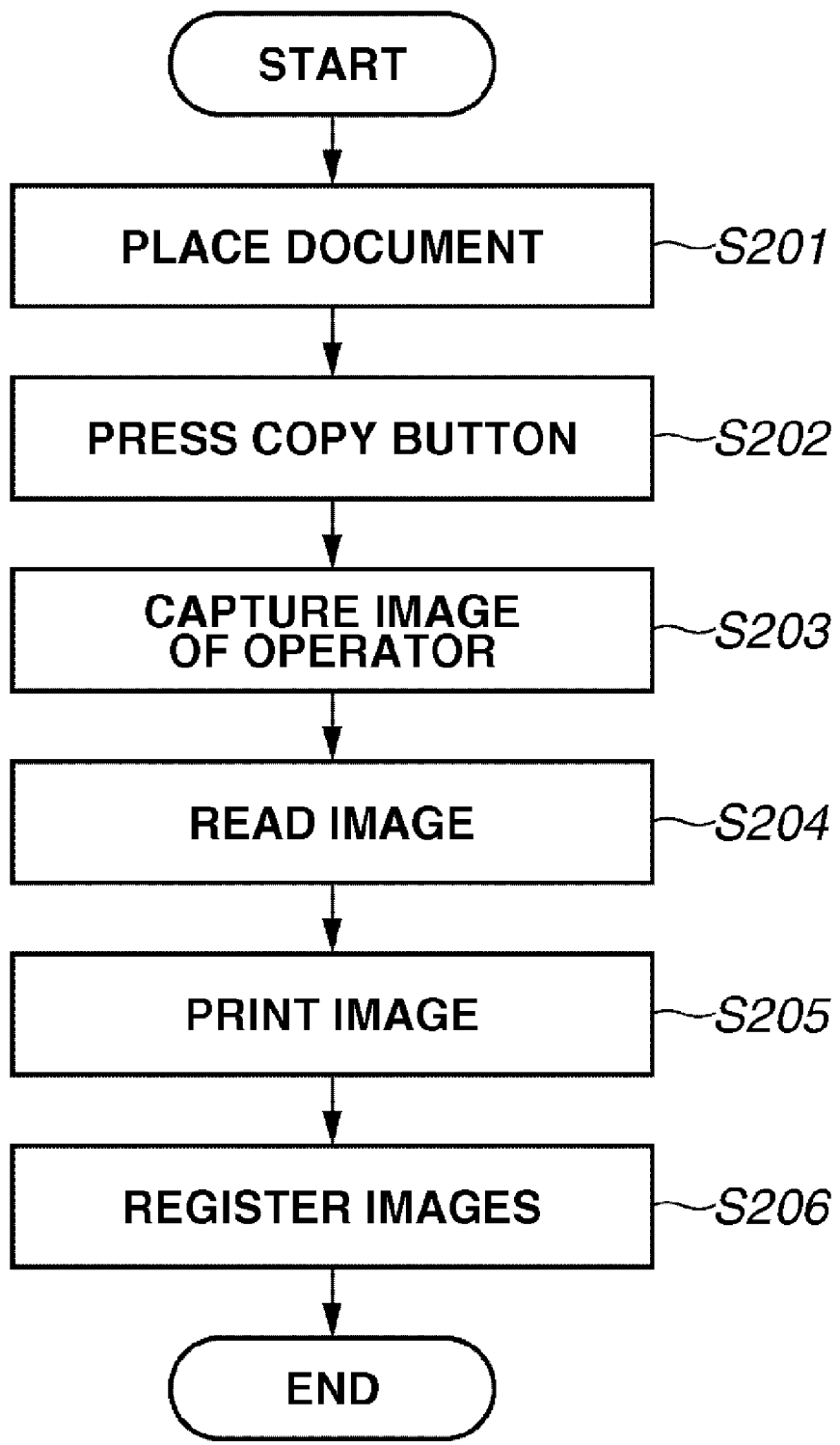
FIG. 2 is a flowchart illustrating image processing according to the exemplary embodiments of the present invention.

An outline of processing in the printing operation will be described using FIG. 2. FIG. 2 is a flowchart illustrating image processing according to the present exemplary embodiment.

First, in step S201, an operator places a document on the document stand. Next, in step S202, the operator presses a copy button. Then, the processing proceeds to step S203. In step S203, in response to the press of the copy button, the data processing unit 103 transmits an image capture signal to the imaging unit 108. The imaging unit 108 responds to the captured signal and shoots the image of the operator. Thus, the imaging unit 108 needs to be installed considering a position where the operator who presses the copy button stands.

Here, the copy button was described as one example. However, the imaging unit 108 may also be installed in a position where routine action is taken by the operator during copying work, to capture the image in response to this routine action. The routine action includes, for example opening and closing of a document cover, and insertion of coins to use the copying machine.

Further, the imaging unit 108 may continuously capture images for a predetermined time. Then, faces are detected from continuously captured images to extract an image which has high accuracy as a face image of the operator, as the identification image. For detection of the face, a conventional method such as pattern matching may be utilized.

Next, in step S204, the image reading unit 101 reads an image from the document on the document stand. In step S205, the printing unit 102 executes printing of the read image.

Finally, in step S206, the data processing unit 103 associates the captured image with the read image to execute the registration processing for registering the images in the database 107.

Figure 3:
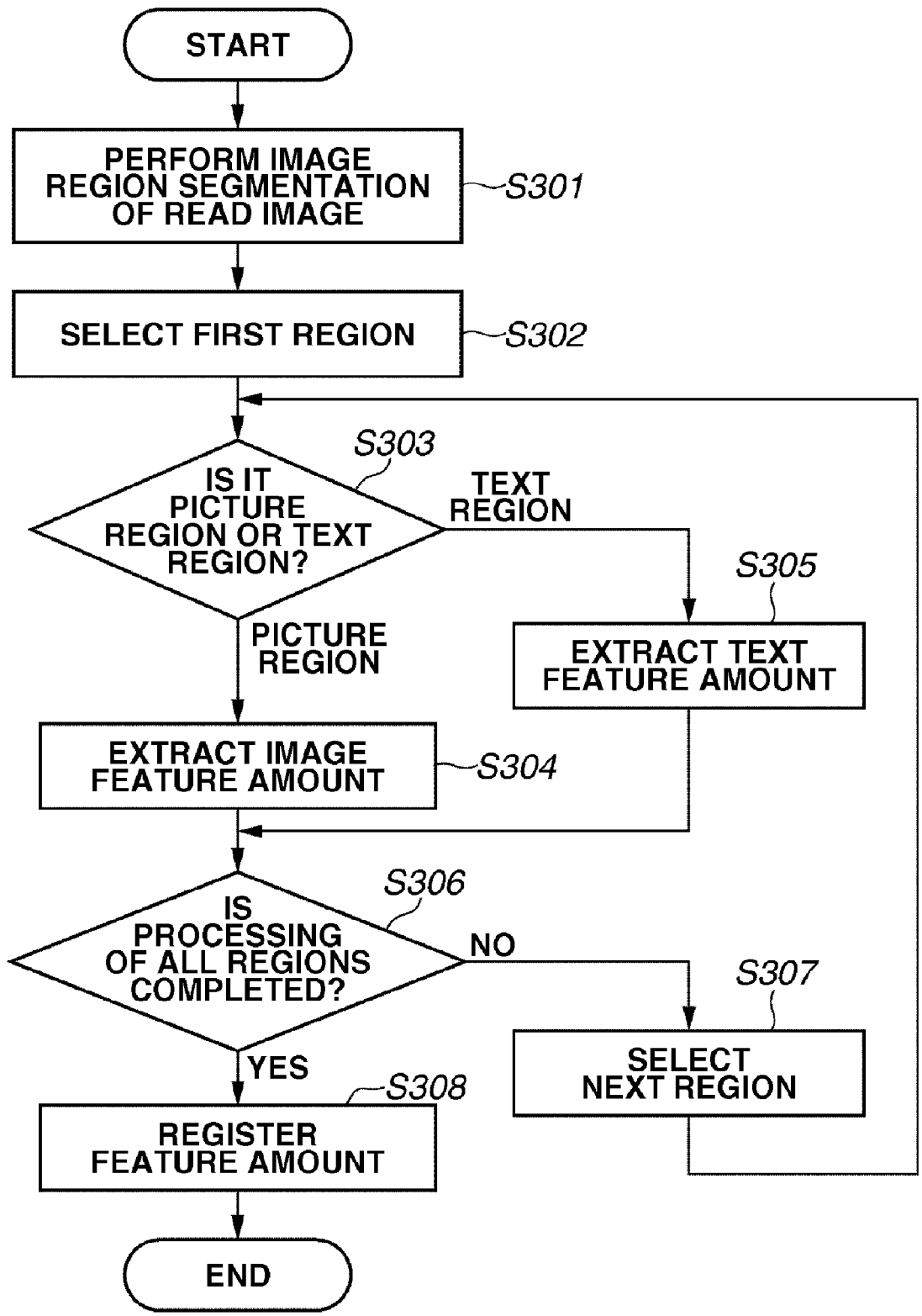
FIG. 3 is a flowchart illustrating image registration processing according to the exemplary embodiments of the present invention.

The details of the registration processing in step S206 will be described using FIG. 3. FIG. 3 is a flowchart illustrating the details of the registration processing according to the present exemplary embodiment.

In the processing of the present exemplary embodiment, the data processing unit 103 sequentially processes a region segmented by image region segmentation. At this time, the data processing unit 103 extracts the feature amount corresponding to each region of the printing information and registers the extracted feature amount in the database 107 as index information. An order to be predetermined will be described below.

First, in step S301, the data processing unit 103 executes segmentation processing for segmenting the read image into a picture region and a text region. The details of the segmentation processing will be described below.

Next, in step S302, the data processing unit 103 selects a region which is processed first.

In step S303, if the region selected by the data processing unit 103 is the picture region (PICTURE REGION in step S303), the processing proceeds to step S304. If the selected region is the text region (TEXT REGION in step S303), the processing proceeds to step S305.

In step S304, the data processing unit 103 extracts the feature amount of an image from the selected region and the processing proceeds to step S306. The details of extraction processing of the feature amount of the image in step S304 will be described below.

In step S305, the data processing unit 103 extracts the feature amount of a text from the selected region and the processing proceeds to step S306. The details of extraction processing of the feature amount of the text in step S305 will be described below.

Next, in step S306, the data processing unit 103 determines whether the extraction processing of the feature amount is completed in all regions. If the extraction processing is completed (YES in step S306), the processing proceeds to step S308. If the extraction processing is not completed (NO in step S306), the processing proceeds to step S307.

In step S307, the data processing unit 103 selects the region to be processed next and the processing returns to step S303.

In step S308, the data processing unit 103 executes processing for registering the feature amount extracted in the above-described processing in the database 107, and the processing ends. With respect to the registration processing of the feature amount in step S308, the details will be described below.

In the present exemplary embodiment, the image region segmentation processing is executed in step S301. However, the feature amount of entire input images may be extracted instead of executing the image region segmentation processing.

In the present exemplary embodiment, the region extracted by the image region segmentation in step S301 is classified into two types of regions, which are the picture region and the text region. However, the region is not limited to these two types. The picture region may further be classified into a photograph region, a drawing region, a line drawing region, a table region or the like. The text region may further be classified into a caption region, a main body region or the like. When the types of regions are increased, a corresponding feature amount may be extracted as necessary.

Layout information about arrangement of the picture region and the text region may also be extracted as the feature amount.

Figure 4:
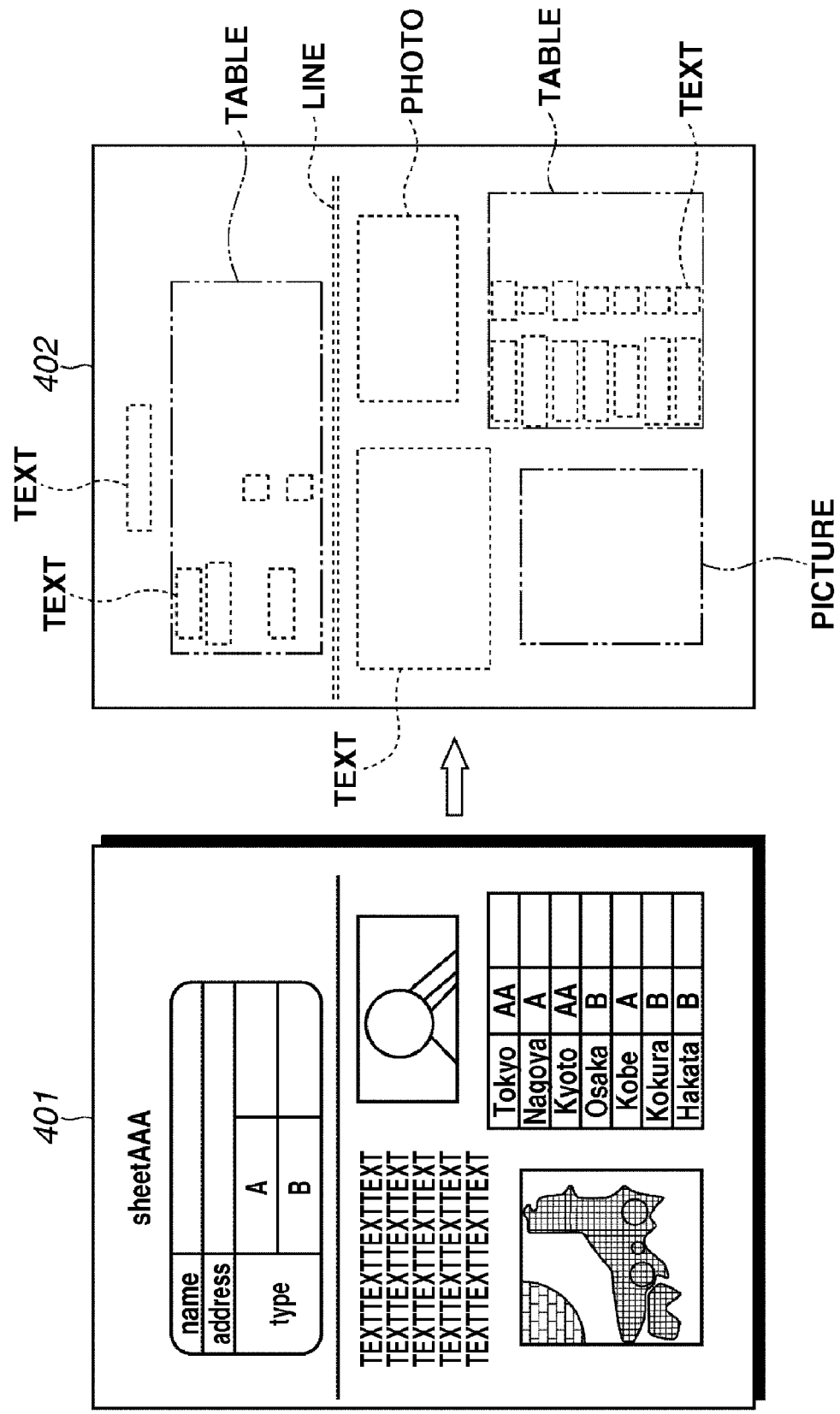
FIG. 4 is a diagram illustrating an example of extracting image blocks.

The details of image region segmentation processing in step S301 will be described using FIG. 4. FIG. 4 is a diagram illustrating an example of dividing an image region according to the present exemplary embodiment.

In the image region segmentation processing, first, the data processing unit 103 distinguishes significant blocks as shown in a divided example 402 from an image 401 in FIG. 4. In more detail, the attribute of each block (e.g., text, picture, photo, line, or table) is determined and the image 401 is divided into blocks having different attributes.

Figure 5:
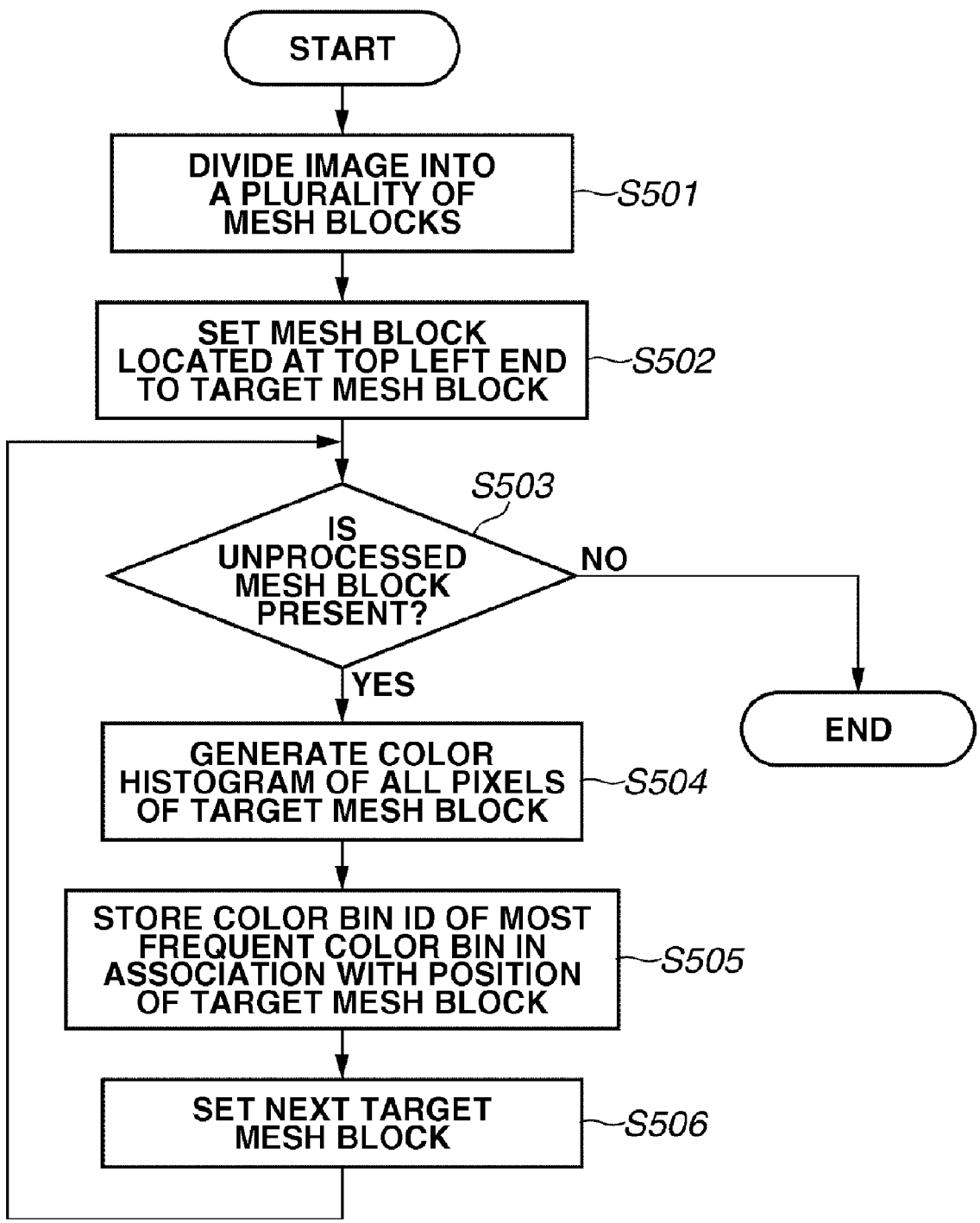
FIG. 5 is a flowchart illustrating extraction processing of a feature amount of an image according to the exemplary embodiments of the present invention.

With respect to the extraction processing of the feature amount of the image of the data processing unit 103 in step S304, the details will be described using the flowchart in FIG. 5.

In the present exemplary embodiment, the extraction processing for the feature amount regarding color of an image is executed. In extraction processing described below, the data processing unit 103 divides an image targeted for extraction processing into a plurality of mesh blocks, and extracts a color having a most frequent color in a color histogram of each mesh block and coordinate information associating position information of each mesh block as image feature information.

Figure 6:
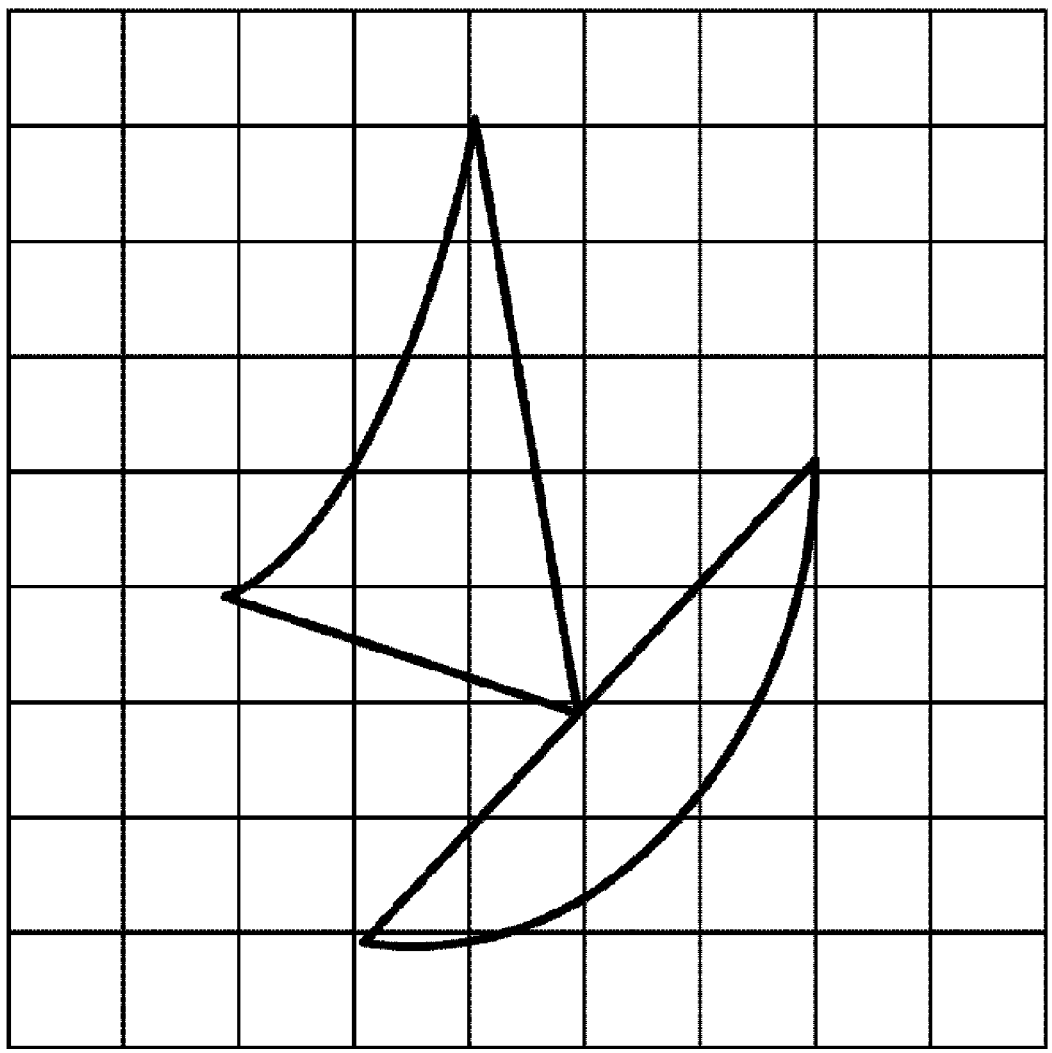
FIG. 6 is a diagram illustrating an example of dividing an image into a plurality of mesh blocks.

First, in step S501, the image is divided into the plurality of mesh blocks. FIG. 6 is a diagram illustrating an example of dividing the image equally into nine rows and nine columns, namely 81 mesh blocks (9 by 9). In actual processing, the image should be further finely divided.

Next, in step S502, the data processing unit 103 selects a first mesh block as a processing target according to a predetermined order of processing. The predetermined order of processing is stored in the storage unit 104 or the like as an order determination table (exemplified in FIG. 7) in advance.

In step S503, the data processing unit 103 determines whether an unprocessed mesh block is present. If the unprocessed mesh block is absent (NO in step S503), the processing ends. On the other hand, if the unprocessed mesh block is present (YES in step S503), the processing proceeds to step S504.

In step S504, the data processing unit 103 projects each concentration value of all pixels in the mesh block onto a partial space (hereinafter, referred to as a color bin) made by dividing a color space (e.g., a red-green-blue (RGB) color space, a luminance, chrominance-blue, and chrominance-red (YCC) color space) illustrated in FIG. 8 to generate a histogram of a color bin as a color histogram. That is, FIG. 8 is a diagram illustrating one example of the configuration of color bins in the color space according to the present exemplary embodiment.

In practice, color bins which further finely divide a color space should be used.

Then, in step S505, the data processing unit 103 determines a color bin ID of the most frequent color bin in the color histogram as a representative color of the mesh block, associates the color bin ID with a position of the mesh block, and stores the color bin ID in the storage unit 104.

Figures 7, 8:
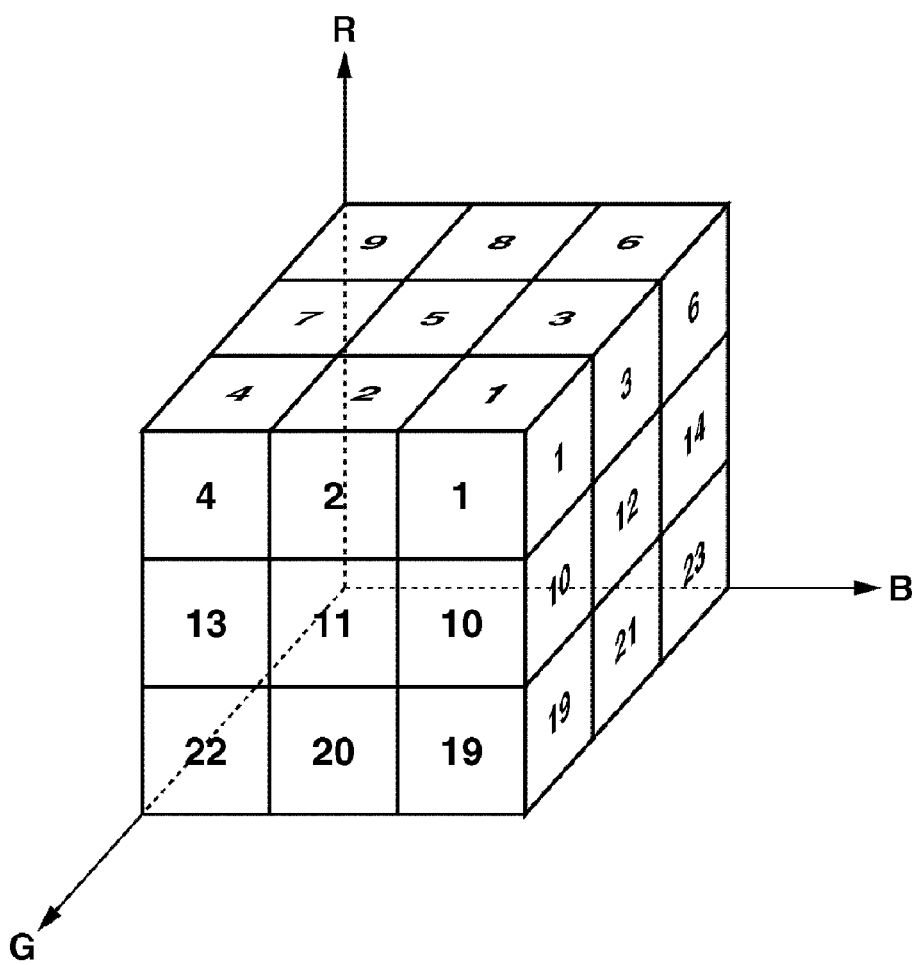
FIG. 7 is a diagram illustrating an example of an order determination table.
FIG. 8 is a diagram illustrating an example of a configuration of color bins on a color space.

In step S506, the data processing unit 103 refers to the order determination table shown in FIG. 7 and sets a target mesh block for next processing. Then, the processing returns to step S503 to repeat processing in steps S503 to S506 until the unprocessed mesh block is absent.

By the above-described processing, the representative color for each mesh block of a processing target image (printing information) and the information associated with the position information about each mesh block can be extracted as the feature amount of the image.

The details of extraction processing of the feature amount of the text in step S305 will be described. In the present exemplary embodiment, a character code which is obtained by performing optical character recognition (OCR) (character recognition) processing on the text in the region is used as the feature amount of the text. As one example, the character code obtained by the OCR processing is used as the feature amount of the text as it is. However, as a result of the OCR processing, statistical data such as a number of characters, a ration of kanji and hiragana characters, and scatter of characters in the region may also be used as the feature amount of the text.

In the OCR (character recognition) processing, the character recognition is made to a character image cut from a character block on a character-by-character basis using one method of pattern matching to obtain a corresponding character code.

The details of the registration processing in which the data processing unit 103 registers the image read by the image reading unit 101 in the database 107 in step S308 will be described.

First, the data processing unit 103 allocates a unique image ID to the read image. Next, the data processing unit 103 stores the image ID in association with the image of the operator as shown in FIG. 9.

Next, the data processing unit 103 allocates a region ID for each region segmented in step S301. Then, as illustrated in FIG. 10, the data processing unit 103 stores and associates the image ID, the region ID, and a region attribute with each other.

As illustrated in FIG. 11, the data processing unit 103 stores and associates the feature amount extracted in step S305 with the region ID and the image ID.

Figure 12:
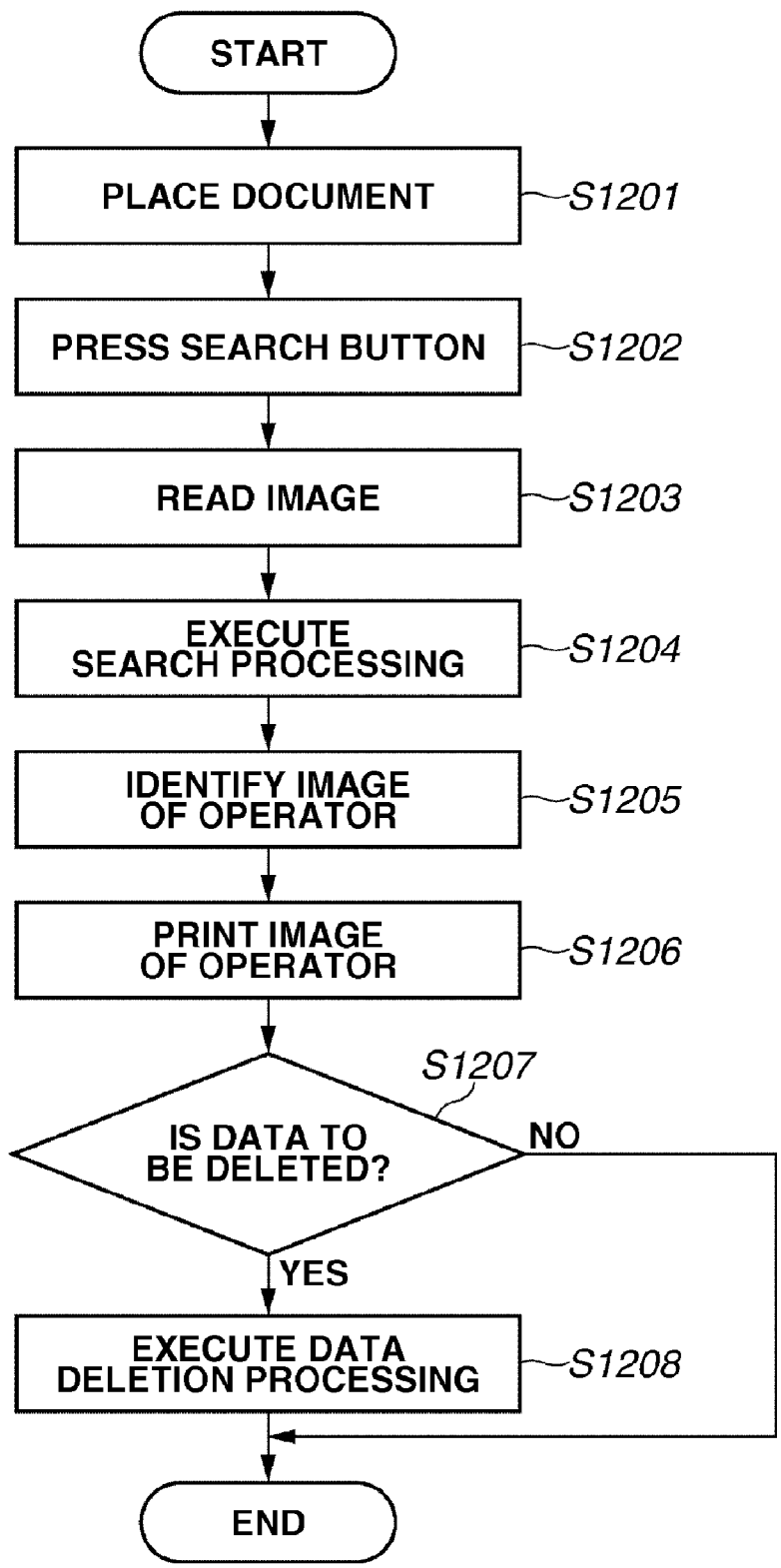
FIG. 12 is a flowchart illustrating an outline of processing for searching information about an operator according to the exemplary embodiments of the present invention.

An outline of the search processing for searching an operator from a document or a printed matter left behind will be described using FIG. 12. FIG. 12 is a flowchart illustrating the outline of processing for searching the operator.

First, in step S1201, an operator places a document on the document stand. Next, in step S1202, the operator presses a search button. In step S1203, the image reading unit 101 reads an image from the document stand.

Next, in step S1204, the data processing unit 103 extracts the feature amount from the read image and executes the search processing to make comparison and search among the feature amounts corresponding to a print document. The details of the search processing in step S1204 will be described below.

Next, in step S1205, the data processing unit 103 specifies the image of the operator using information shown in FIG. 9 from registered images narrowed down by the search processing in step S1204. In step S1206, the printing unit 102 prints the image of the operator. If the image of the operator cannot be narrowed down to one image, candidate images of the operator may sequentially be printed.

In step S1207, the data processing unit 103 makes an inquiry to the operator whether to delete data. If the data is to be deleted (YES in step S1207), the processing proceeds to step S1208. If the data is not to be deleted (NO in step S1207), the processing ends as it is. In step S1208, the data processing unit 103 deletes the data and the processing ends.

In the present exemplary embodiment, a result of search is printed. However, the result of search may be displayed on a monitor.

In a case of the image forming apparatus installed at a place having a high possibility that the same document is printed many times, the result of search may become an enormous amount. Thus, it is desirable to narrow down the search by setting conditions such as a recording date and time and a print condition.

If the face image of the operator is used as the identification, it is desirable to set only a manager to be allowed to use the search processing. Further, images to be used in the search can be read and captured by the video camera included in the imaging unit 108 other than is read using the document stand. In this case, a high definition image is difficult to obtain. Thus, a reduced image may be stored in the database 107 as the feature amount. An image-captured document may be compared with the reduced image in the database 107 without dividing into regions.

Figure 13:
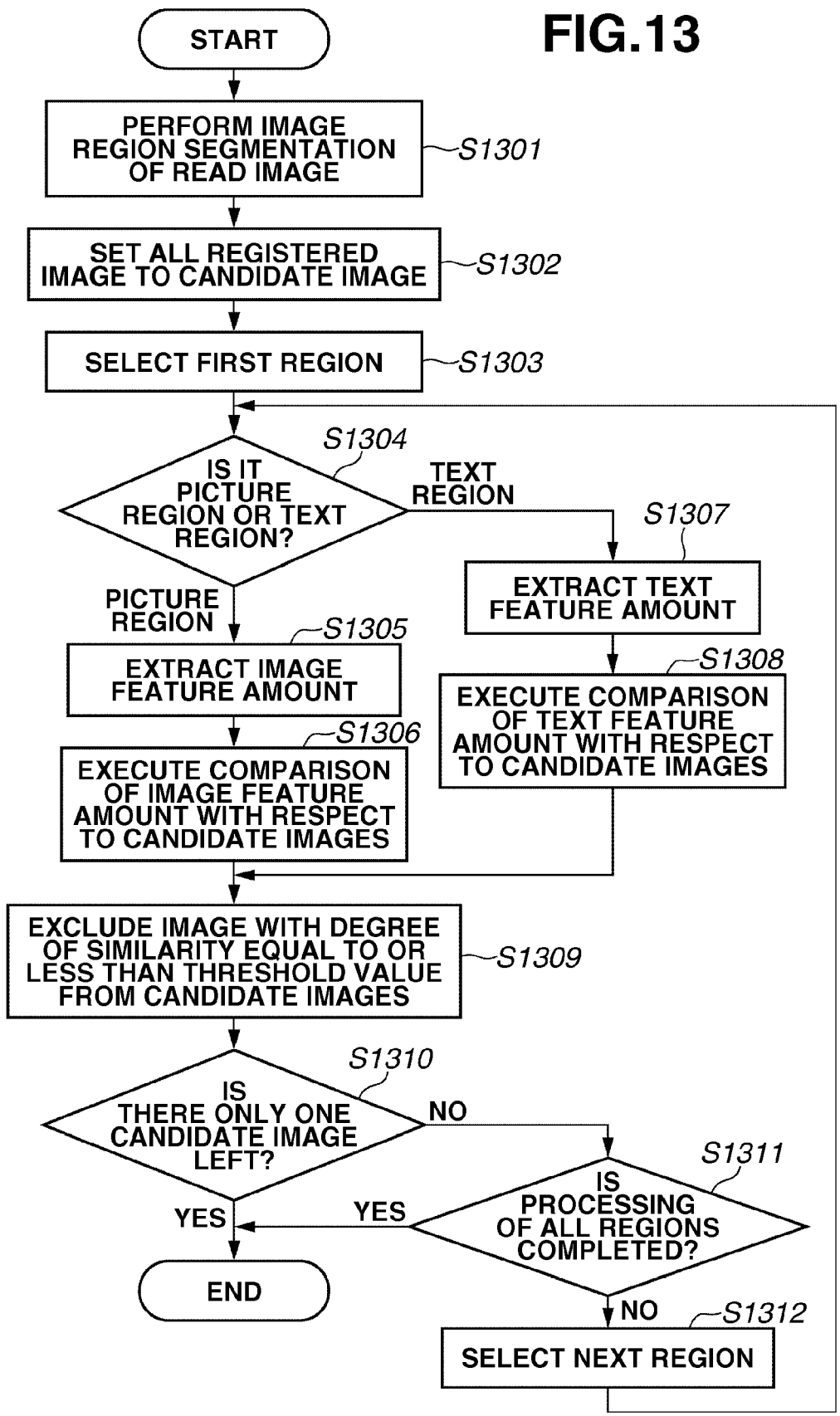
FIG. 13 is a flowchart illustrating a detail of search processing according to the exemplary embodiments of the present invention.

The details of the search processing that the data processing unit 103 executes in step S1204 will be described using FIG. 13. FIG. 13 is a flowchart illustrating the search processing according to the present exemplary embodiment.

First, in step S1301, the data processing unit 103 executes the above-described image region segmentation processing to the read image read by the image reading unit 101.

Next, in step S1302, the data processing unit 103 sets all registered images as candidate images.

In step S1303, the data processing unit 103 selects a region to be processed first among the read images as a processing target.

In step S1304, if the selected region is the picture region (PICTURE REGION in step S1304), the processing proceeds to step S1305, and if the select region is the text region (TEXT REGION in step S1304), the processing proceeds to step S1307.

In step S1305, the data processing unit 103 executes the above-described feature amount extraction processing of the image. In step S1306, the data processing unit 103 compares the feature amount of the image with the feature amount of the image in the picture region contained in the candidate image. Then, the processing proceeds to step S1309. The details of the comparison processing of the feature amount of the image in step S1306 will be described below.

In step S1307, the data processing unit 103 executes the above-described feature amount extraction processing of the text. In step S1308, the data processing unit 103 compares the feature amount of the text with the feature amount of the text in the text region contained in the candidate image. Then, the processing proceeds to step S1309. The details of the comparison processing of the feature amount of the text in step S1308 will be described below.

In step S1309, the data processing unit 103 excludes an image whose degree of similarity is less than or equal to a threshold value from the candidate image.

In step S1310, the data processing unit 103 determines whether there is only one candidate image left. If the candidate image is narrowed to one image (YES in step S1310), the processing ends. If the candidate image is not narrowed to one image (NO in step S1310), the processing proceeds to step S1311.

In step S1311, the data processing unit 103 determines whether the comparison processing of the feature amount for all regions is completed. If the comparison processing of the feature amount for all regions of the read image is completed (YES in step S1311), the processing ends. Further, if it is not completed so far (NO in step S1311), the processing proceeds to step S1312.

In step S1312, the data processing unit 103 selects the region to be processed next and the processing returns to step S1304.

In the present exemplary embodiment, candidates are narrowed down by comparing the region individually. However, the candidate may also be determined by a comprehensive decision after comparing all regions.

Further, if layout information is extracted when the feature amount is extracted, the layout information may be compared.

Figure 14:
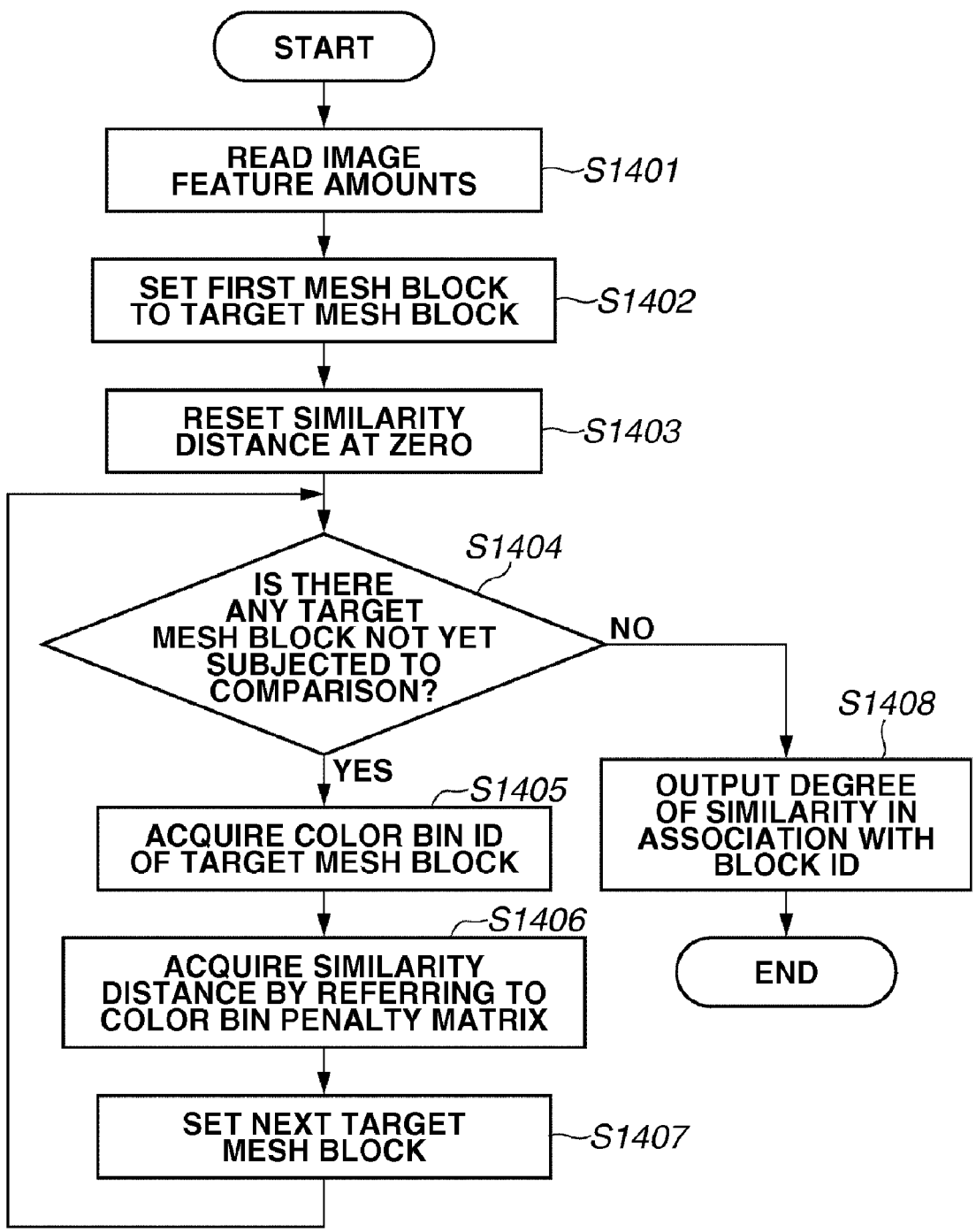
FIG. 14 is a flowchart illustrating processing for comparing a feature amount of an image according to the exemplary embodiments of the present invention.

The details of the comparison processing of the feature amount of the image in step S1306 will be described using FIG. 14. FIG. 14 is a flowchart illustrating the details of the comparison processing of the feature amount of the image which is executed by the data processing unit 103.

First, in step S1401, the data processing unit 103 reads a feature amount of an original image for a search and a feature amount of a comparison target image. Next, in step S1402, the data processing unit 103 sets mesh blocks in the read image of a processing target. Further, in step S1403, the data processing unit 103 initializes a similarity distance to zero. The similarity distance refers to a degree of similarity between the feature amount of the original image for the search and the feature amount of the comparison target image.

Then, in step S1404, the data processing unit 103 determines whether a mesh block which is not yet compared is present. If no mesh block which is not yet compared is present (NO in step S1404), the processing proceeds to step S1408. On the other hand, if the mesh block which is not yet compared is present (YES in step S1404), the processing proceeds to step S1405.

In step S1405, the data processing unit 103 acquires a color bin ID of each mesh block from each feature amount of the original image for the search and the comparison target image. Next, in step S1406, the data processing unit 103 acquires a local similarity distance of each mesh block corresponding to the acquired color bin IDs by referring to a penalty matrix as shown in FIG. 15 (details will be described below). Then, the data processing unit 103 cumulatively adds the acquired local similarity distance to the similarity distance which is acquired by the processing until immediately before. The data processing unit 103 stores the calculated similarity distance in the storage unit 104.

Here, the penalty matrix will be described using FIG. 15. FIG. 15 is a diagram illustrating an example of one configuration of a color bin penalty matrix which is used in the present exemplary embodiment. The color bin penalty matrix is defined as a local similarity distance matrix in combination of all color bins. As shown in FIG. 15, the similarity distance between the same color bins is zero. The larger a difference of the feature amount between the color bins, that is, the lower the degree of similarity, the larger the similarity distance between the color bins.

Accordingly, in the image processing apparatus according to the present exemplary embodiment, by only referring to the color bin penalty matrix as shown in FIG. 15, the similarity distance of each color bin ID can be acquired. Thus, processing speed can be increased.

Then, in step S1407, the data processing unit 103 refers to the order determination table illustrated in FIG. 7 and sets a target mesh block for next processing.

In step S1404, if it is determined that no mesh block which is not yet compared is present (NO in step S1404), in step S1408, the data processing unit 103 converts the similarity distance stored in the storage unit 104 into the degree of similarity, and outputs the degree of similarity together with a block ID in pairs.

On the other hand, in the comparison processing of the feature amount of the text in step S1308 of FIG. 13, the data processing unit 103 compares the feature amount of the read image with the feature amount which is registered in the database 107. In more detail, the data processing unit 103 compares each character code in a character block with each other to calculate the degree of similarity from the degree of its coincidence.

In the present exemplary embodiment, the imaging apparatus is provided to capture the face image as an identification to identify the operator of a copying machine. According to the present exemplary embodiment, a possessor can be accurately specified from a document and printed matter left behind.

Second Exemplary Embodiment

According to another exemplary embodiment, an image captured by a monitoring camera or the like taking a picture around the apparatus is diverted to search a possessor from a medium left behind.

Components having the same function as that of the first exemplary embodiment are denoted with the same reference numeral, and descriptions for those having the same constitution and function are omitted.

The outline of processing in the printing operation will be described using FIG. 2.

Step S201 and steps S202 to S205 are similar to the first exemplary embodiment. In step S206, the data processing unit 103 extracts the feature amount from the read image, associates the feature amount with a date and time that the image is output (recording date and time), and registers the feature amount. The details of the registration processing in step S206 will be described below.

The details of the registration processing of the feature amount will be described.

First, the data processing unit 103 allocates a unique image ID to the read image and stores the image ID in association with the recording date and time. FIG. 16 is a table illustrating an example of index information including the image ID and the recoding date and time which are registered in the present exemplary embodiment.

Next, the data processing unit 103 allocates a region ID for each region segmented in step S301 and stores the region ID in association with the image ID and a region attribute. FIG. 10 is a table illustrating an example of index information including the image ID, the region ID, and the region attribute which are registered in the present exemplary embodiment.

Next, the data processing unit 103 associates the feature amount corresponding to each region with the image ID and the region ID, and stores them in the database 107. FIG. 11 is a table illustrating an example of index information including the image ID, the region ID, and the feature amount.

In the present exemplary embodiment, a monitoring camera executes image capturing independent from the operation of the image forming apparatus. The monitoring camera captures an image at least at a moment or a time zone when the apparatus is used. Further, information about the recording date and time is added to the record. The image captured by the monitoring camera is received by a reception unit of the image forming apparatus so that the captured image can be referenced.

Figure 17:
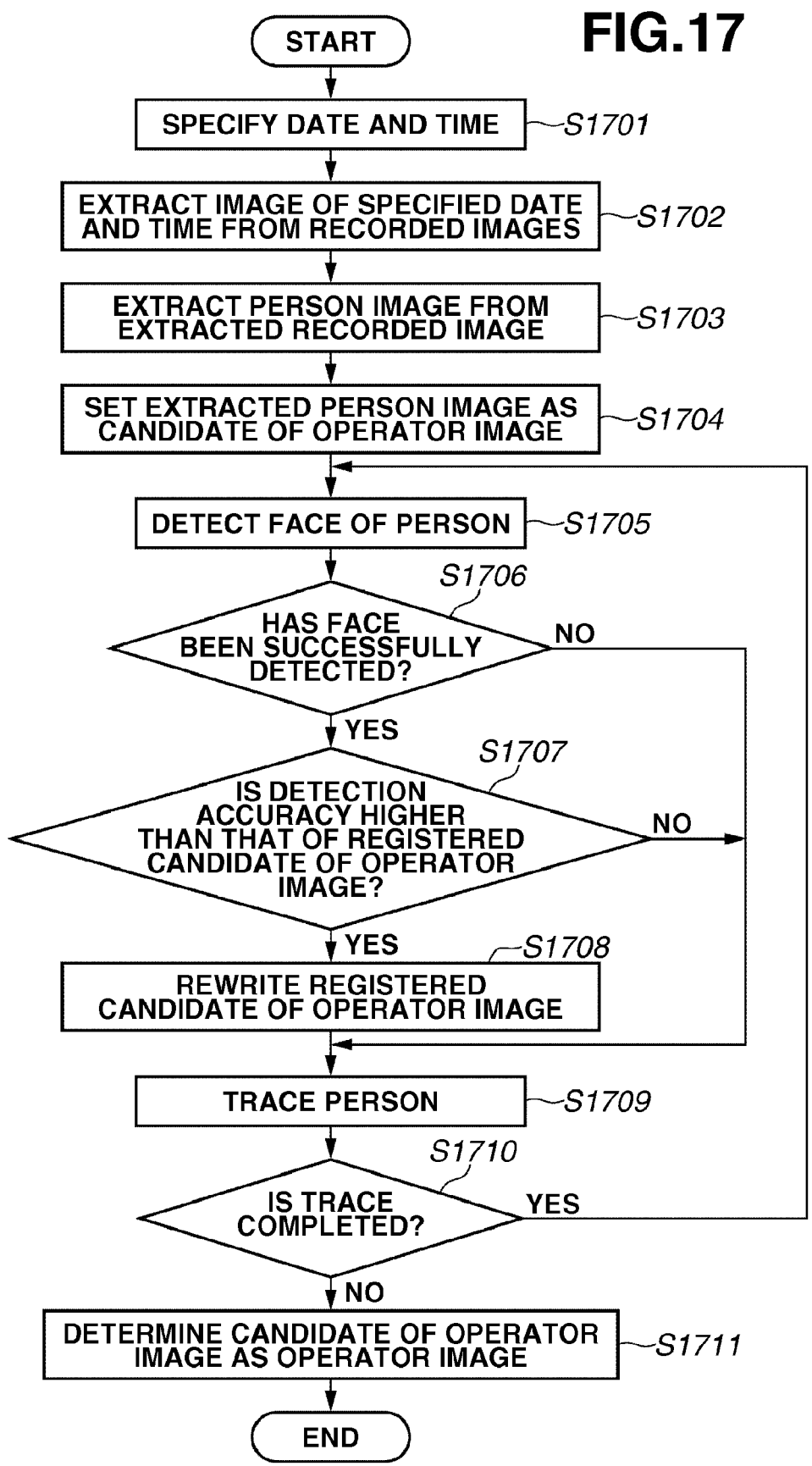
FIG. 17 is a flowchart illustrating the detail of search processing according to the exemplary embodiments of the present invention.

The details of the search processing will be described using FIG. 17. FIG. 17 is a flowchart illustrating the details of the search processing by the data processing unit 103.

First, in step S1701, the data processing unit 103 specifies the date and time using FIG. 16 from the index information narrowed by the search processing.

Next, in step S1702, the data processing unit 103 extracts a recorded image corresponding to the recording date and time from the recorded images of the monitoring camera. In step S1703, the data processing unit 103 extracts a person who operates the image forming apparatus from the extracted recorded image. With respect to the extraction processing of the person, a conventional method such as acquiring a difference between the extracted recorded image and an image captured when a person is absent around the image forming apparatus, or pattern matching may be utilized. Next, in step S1704, the data processing unit 103 sets the extracted recorded image as a candidate image of the operator.

Next, in step S1705, the processing apparatus of the imaging unit 108 or the data processing unit 103 detects a face from the candidate image of the operator. In step S1706, the data processing unit 103 determines whether the face has been successfully detected. If the face has been detected (YES in step S1706), the processing proceeds to step S1707. If the face has not been detected (NO in step S1706), the processing proceeds to step S1709. Instep S1707, the processing apparatus of the imaging unit 108 or the data processing unit 103 determines whether detection accuracy of the face in the image is higher than that of registered candidate of operator image. If the detection accuracy of the face in the image is higher than that of the currently registered image of the operator (YES in step S1707), the processing proceeds to step S1708. If the detection accuracy of the face in the image is lower than that of the currently registered image of the operator (NO in step S1707), the processing proceeds to step S1709. In step S1708, the image of the operator is overwritten.

Next, in step S1709, the processing apparatus of the imaging unit 108 or the data processing unit 103 traces the person in images recorded by the monitoring camera which is continuously obtained. In step S1710, the processing apparatus of the imaging unit 108 or the data processing unit 103 determines whether the trace is completed. If the person has been traced after a fixed time interval (frames) (YES in step S1710), the processing returns to step S1705. If the person has not been traced (NO in step S1710), it is determined that the operator moved outside the region of the monitoring camera. The trace ends and the processing proceeds to step S1711.

Finally, in step S1711, the candidate image of the operator is specified as the image of the operator and set as the identification image.

In the present exemplary embodiment, a still image is used in the processing in step S1206. However, a moving image may be reproduced for the processing. Further, in the present exemplary embodiment, the trace is executed after the corresponding date and time. However, the trace maybe executed retroactive to a date and time before the corresponding date and time.

Other Exemplary Embodiment

The present invention is described based on the image forming apparatus. However, the present invention may be implemented as the image processing apparatus for monitoring the image forming apparatus (e.g., a video camera and a server for processing images from the video camera). Further, the present invention can be applied to not only the image forming apparatus but also all recording apparatuses which record and output recorded information on a recording medium such as a digital versatile disc (DVD) and a compact disc (CD).

Furthermore, in the above-described exemplary embodiments, a face is used for an imaging target as a physical feature of an operator. However, physical features such as a fingerprint and vein authentication may be used for the imaging target as identification information. In this case, an imaging unit maybe installed on a key which is essential to image forming processing among an input unit 105 and the identification information may be acquired in response to a movement of an operator. When a person can be easily identified even if a detailed image of a face is not obtained owing to an installation place of the image forming apparatus, the image of an upper and lower costume may be captured and detected.

In an office, when a large amount of copies are made, an operator may move away from a front of the apparatus and even if the copying finishes, documents and printed matters may be left. By applying the present invention, a person who made copies can be searched, documents or printed matters can be carried to a possessor, and the possessor can be urged to collect documents or printed matters.

Furthermore, the above-described exemplary embodiments are applied as a countermeasure after documents or printed matters are left behind. However, depending on a form of using a recording apparatus, the whole image of a previous operator may be displayed on a display until a next operator operates the apparatus to prevent documents or printed matters from being left.

The present invention can be applied to an apparatus including a single device or to system constituted of a plurality of devices.

Further, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by a computer, the program code installed in the computer also implements the present invention. In other words, the claims of the present invention also include a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, a compact disk read-only memory (CD-ROM), a CD-recordable (CD-R), a CD-rewritable (CD-RW), a magnetic tape, a non-volatile type memory card, a ROM, and a digital versatile disk (DVD (DVD-ROM and a DVD-R)).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by a computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-258888 filed Oct. 2, 2007, which is hereby incorporated by reference herein in its entirety.

What is claimed is:

1. An image processing apparatus, the image processing apparatus comprising:
an extraction unit configured to extract a feature amount from information recorded on a recording medium;

a storage unit configured to store the feature amount and time information from a particular time when the information is recorded on the recoding medium, wherein the time information from the particular time when the information is recorded on the recording medium is associated with the feature amount;

a search unit configured to compare a feature amount extracted from a predetermined medium by the extraction unit as a query with the feature amount stored in the storage unit, wherein, based on a result of the comparison, a recording medium with a high degree of similarity to the predetermined medium is determined as a search result;

an acquisition unit configured to acquire an identification image, from an image captured by a monitoring camera taking a picture around the image processing apparatus, identifying an operator of the image processing apparatus based on time information from the particular time when information is recorded on the recording medium determined as the search result by the search unit; and an output unit configured to output the identification image acquired by the acquisition unit.

2. The image processing apparatus according to claim 1, wherein the feature amount is information related to the information recorded on the recording medium.

3. The image processing apparatus according to claim 1, wherein the acquisition unit includes an imaging unit, wherein the imaging unit captures an image of the operator in response to a signal from the image processing apparatus.

4. The image processing apparatus according to claim 3, wherein the image processing apparatus includes a face detection unit,
wherein the face detection unit detects a face from the image captured by the imaging unit, and
wherein the acquisition unit sets the captured image in which the face is detected as the identification image.

5. The image processing apparatus according to claim 1, wherein the identification image includes information about a date and time that relevant recorded information was used for recording.

6. An image processing apparatus, the image processing apparatus comprising:
a reading unit configured to read recorded information;
a recording unit configured to record the read recorded information on a recording medium;
a reception unit configured to receive an identification image identifying an operator of the image processing apparatus;
an extraction unit configured to extract a feature amount from the recorded information;
a storage unit configured to store the feature amount and time information from a particular time when the information is recorded on the recording medium, wherein the time information from the particular time when the information is recorded on the recording medium is associated with the feature amount;
a search unit configured to compare a feature amount extracted from a predetermined medium by the extraction unit as a query with the feature amount of the recorded information, wherein, based on a result of the comparison, a recording medium with a high degree of similarity to the predetermined medium is determined as a search result;
an acquisition unit configured to acquire an identification image, from an image captured by a monitoring camera taking a picture around the image processing apparatus, identifying an operator of the image processing apparatus based on time information from the particular time when information is recorded on the recording medium determined as the search result by the search unit; and
an output unit configured to output the identification image acquired by the acquisition unit.

7. A method for processing images, the method comprising:
extracting a feature amount from recorded information recorded on a recording medium;
storing the feature amount and time information from a particular time when the information is recorded on the recoding medium, wherein the time information from the particular time when the information is recorded on the recording medium is associated with the feature amount;
comparing a feature amount extracted from a predetermined medium as a query with the stored feature amount, wherein based on a result of the comparing, a recording medium with a high degree of similarity to the predetermined medium is determined as a search result;
acquiring an identification image identifying an operator of the image, from an image captured by a monitoring camera taking a picture around the image processing apparatus, processing apparatus based on time information from the particular time when information is recorded on the recording medium determined as the search result by the search unit; and
outputting the identification image acquired.

8. A program stored on a non-transitory computer readable storage medium, the program enabling a computer to execute the method of claim 7.

* * * * *